(No Model.)
L. M. SMITH.
ROAD CART.
No. 455,860. Patented July 14, 1891.
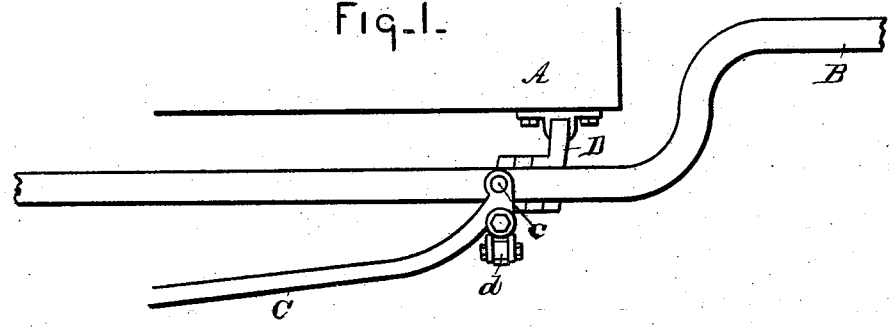
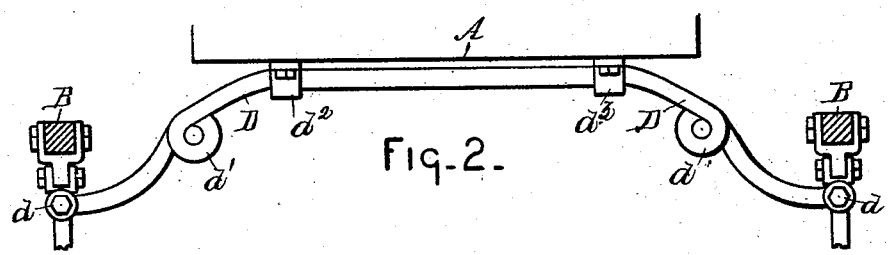
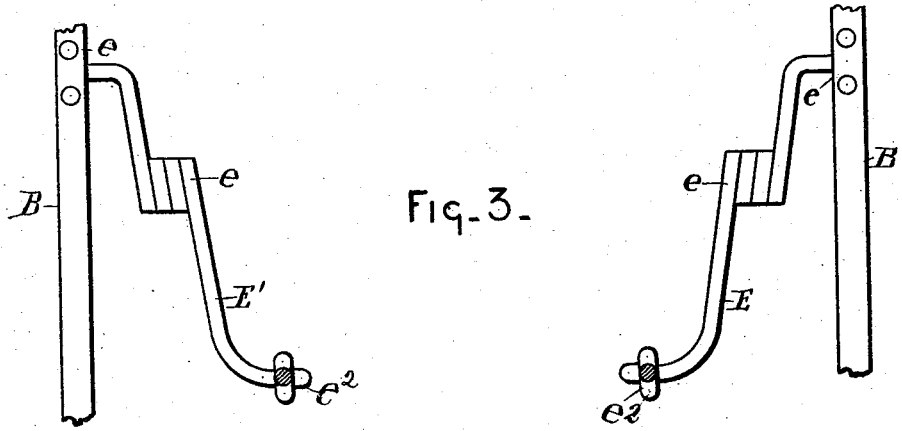
WITNESSES
C. J. Shipley.
F. Clough.
INVENTOR
Loring M. Smith.
By Wells N. Leggett & Co.
Attorneys.

UNITED STATES PATENT OFFICE.

LORING M. SMITH, OF ROMEO, MICHIGAN.

ROAD-CART.

SPECIFICATION forming part of Letters Patent No. 455,860, dated July 14, 1891.

Application filed October 13, 1890. Serial No. 367,978. (No model.)

*To all whom it may concern:*

Be it known that I, LORING M. SMITH, a citizen of the United States, residing at Romeo, county of Macomb, State of Michigan, have invented a certain new and useful Improvement in Road-Carts; and I declare the following to be a full, clear, and exact description of the invention, such as will enable others skilled in the art to which it pertains to make and use the same, reference being had to the accompanying drawings, which form a part of this specification.

It is the object of my invention to provide a spring-support for the forward end of the body of a two-wheeled vehicle, whereby the body will yield at both the forward and rear ends, and much of the present objectionable horse motion be thus overcome; and it consists in a combination of devices and appliances hereinafter described and claimed.

In the drawings, Figure 1 is a side elevation of the forward end of my cart, illustrating the construction. Fig. 2 is a front elevation of the same. Fig. 3 represents a variation.

In carrying out the invention, A represents the body, and B the shafts.

Inasmuch as my invention relates only to the forward end, I have not shown the axle or wheels or the manner of supporting the rear end of the body, that being entirely immaterial and my invention being applicable to a cart in which any desired construction is employed for the rear portion.

In Fig. 1 I have shown my invention as applied to a construction for which I have already made application, Serial No. 355,980, in which the arm C extended forward from the axle and was rigidly engaged thereto, and the shafts were pivoted to the said arm, as at $c$, the free ends of the shafts being allowed to play vertically.

D is what is commonly known as a "torsion-spring." It is engaged at one end, as at $d$, to the end of the arm C. It then curves upward, as shown in Fig. 2, to a point about midway between the shaft and the body, when it is given a number of convolutions, as at $d'$, the number depending upon the size of the spring-bar and the weight which it is to sustain. The spring then extends on upward to a point underneath the body, where it is clipped or attached, as at $d^2$. It then extends on across the body and is engaged again, as at $d^3$. It then curves downward, and is again turned into a number of convolutions corresponding with those on the opposite side, and then curved on down to the opposite arm C, where it is engaged. By this construction, as will be seen, the body at its forward end will be permitted to have not only a vertical yielding motion, but it may have a certain amount of forward-and-back motion, since the spring D will yield, because of its peculiar construction, in any desired direction, either to a vertical pressure or to a pressure lengthwise of the cart.

In Fig. 3 the spring, instead of being a single bar extending from shaft to shaft, is divided and made into two springs E E'. One end $e$ is engaged to the shaft and projects in slightly therefrom, is then curved and extended forward and upward, giving the desired number of convolutions, as at $e'$, and then extended on up to the body, where the other end is clipped or engaged, as at $e^2$.

I would of course have it understood that the end of the spring in either construction may be attached directly to the shafts or, as shown in Figs. 1 and 2, attached to the arm which extends out, and to which the shaft is engaged, and I would be understood as including both these forms in my claims.

What I claim is—

1. The combination, with the body A, the shaft B, and the arm C, connected at its forward end with the shaft, of a torsion-spring bar extending transversely to the line of draft, having its outer end connected with the forward end of said arm below the shaft, curved upward therefrom and engaged with the body, and between the points of attachment to the arm and body formed with spiral convolutions, substantially as described.

2. The combination, with the body A, the shafts B, and the arms C, connected at their forward ends with the shafts, of a torsion-spring bar extending transversely beneath and engaged with the body and having its opposite end portions bent downward and connected with the forward ends of the said arms below the shafts and between the latter and the points of engagement with the body formed with spiral convolutions, substantially as described.

3. The combination, with the shafts B and body A, of a torsion-spring bar D, extending transverse to the line of draft, formed with spiral convolutions and having two portions projecting in opposite directions from the spiral convolutions and connected, respectively, with the shaft and body, substantially as described.

In testimony whereof I sign this specification in the presence of two witnesses.

LORING M. SMITH.

Witnesses:
G. H. WASHER,
WM. LE DICKEN.